Feb. 10, 1970   C. FRIEBERGER ET AL   3,494,329
SYSTEM FOR MEASURING THE ACTIVITY OF TEST ANIMALS
Filed July 17, 1967   3 Sheets-Sheet 2
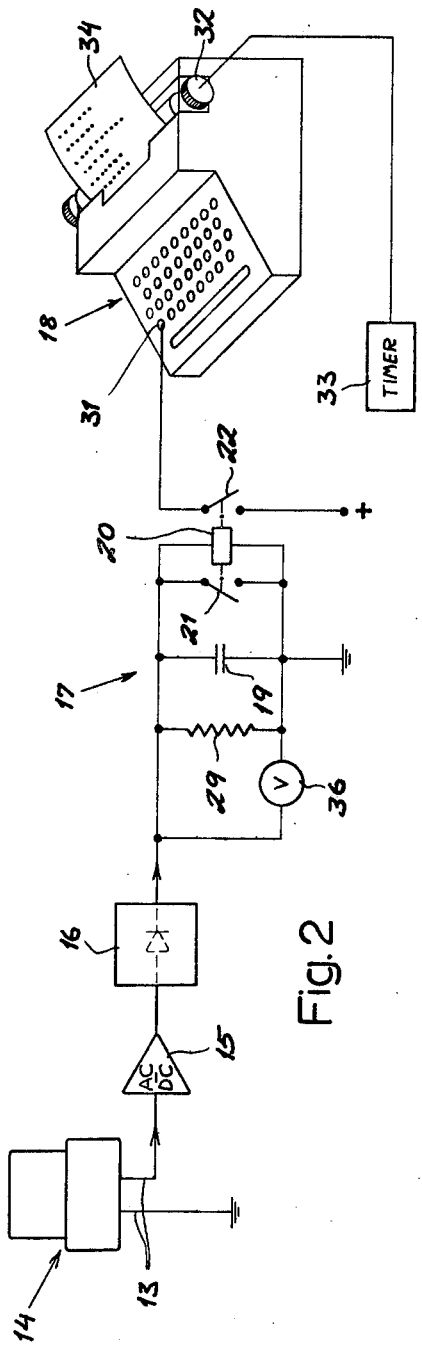
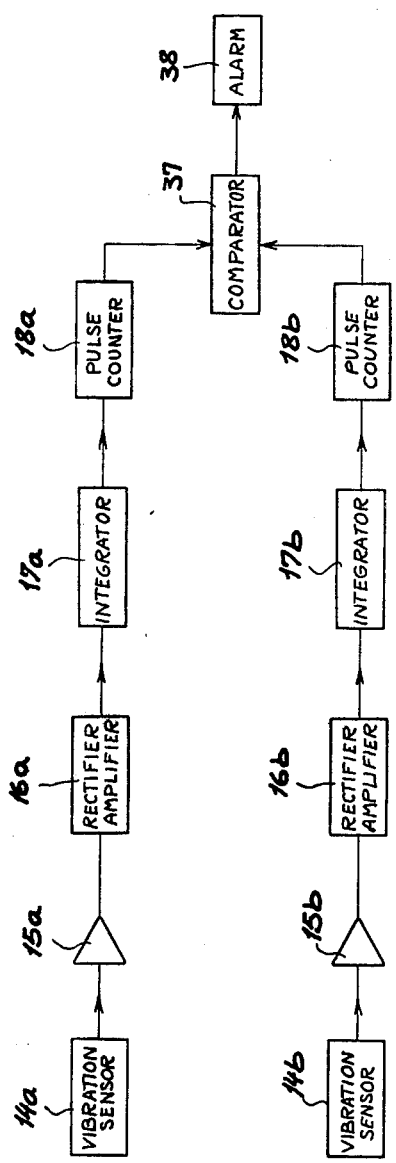
Christian Frieberger
Heinrich Malczynski
INVENTORS.
BY
Karl G. Ross
Attorney Feb. 10, 1970　　　C. FRIEBERGER ET AL　　　3,494,329
SYSTEM FOR MEASURING THE ACTIVITY OF TEST ANIMALS
Filed July 17, 1967　　　　　　　　　　　　3 Sheets-Sheet 3
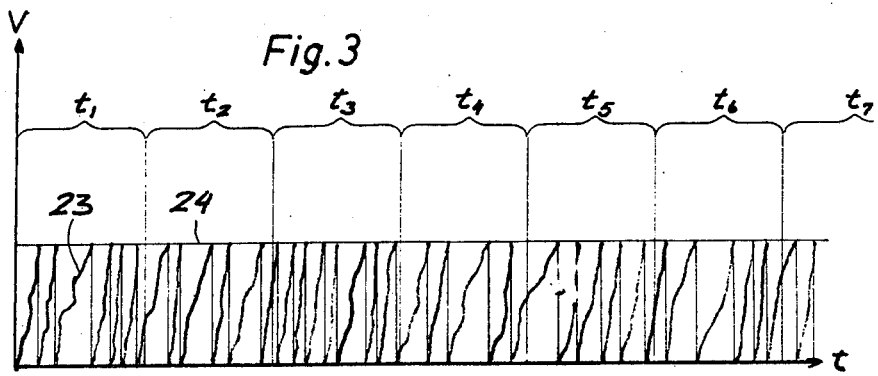
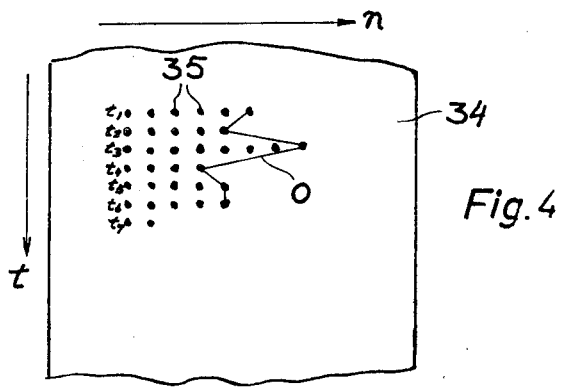
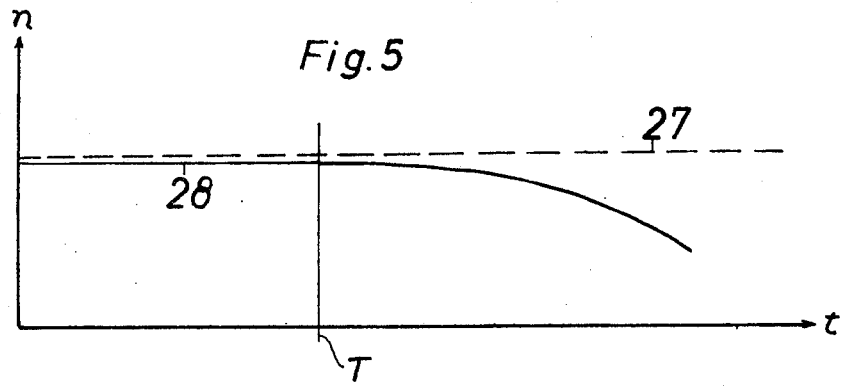
Christian Frieberger
Heinrich Malczynski
INVENTORS.
BY Karl F. Ross
Attorney United States Patent Office 3,494,329
Patented Feb. 10, 1970

3,494,329
SYSTEM FOR MEASURING THE ACTIVITY OF TEST ANIMALS
Christian Frieberger, Vegagasse 15, and Heinrich Malczynski, Knauergasse 1–3, both of Vienna, Austria
Filed July 17, 1967, Ser. No. 653,754
Int. Cl. G01n 29/00; A01k 1/00, 29/00
U.S. Cl. 119—1                                   6 Claims

ABSTRACT OF THE DISCLOSURE

Cage for test animals whose activity is to be measured, the bottom of the cage being in the form of a vibratile platform supported on a loudspeaker diaphragm which acts as a vibration sensor and whose audio-frequency output is integrated and measured.

---

Our present invention relates to a system for measuring the activity of test animals, such as rodents, subjected to different types of treatment.

Any new drug or other chemical designed for ultimate use on humans must be first administered to such test animals to permit observation of its biological effects. According to available statistics, an average of 75 new chemical substances of this type per day are produced in the United States alone. To perform the necessary toxicity tests, a large number of mice, rats or other suitable animals must be used and, frequently, sacrificed.

The general object of our present invention is to provide a system for automatically and accurately registering departures from the normal behavior of a test animal, or a group of such animals, under the effect of a chemical injected into the animal or admixed with its food, or of environmental factors such as noise, radiation or atmospheric conditions. Through the use of such a system, pursuant to a more particular object of our invention, significant changes in the pattern of activity of the test animal may be detectable at an early stage so that the duration of the experiment is foreshortened and, in many instances, the animal need not be sacrificed.

These objects are realized, in accordance with our present invention, by the provision of a cage for the confinement of the test animal or animals, the bottom of this cage being designed as a vibratile platform whose vibrations are sensed by an associated electromechanical transducer and converted into an electrical output registerable by conventional indicator means. More specifically, according to another feature of our invention, the transducer may be in the form of a diaphragm of an electroacoustic voltage generator, such as a commercially available loudspeaker, having the vibratile platform mounted thereon.

The audio-frequency output of the transducer may be amplified, rectified and integrated to produce a progressively varying unipolar voltage whose change in magnitude is a measure of the rate and intensity of the movements of the animal; whenever this voltage reaches a predetermined limit, the circuits are restored to normal and the cycle is repeated. By this means, upon recordal of the signal pulses on a time chart, the recurrence rate or cadence of these pulses can be ascertained, any change in this cadence representing a corresponding increase or decrease in the activity of the test animal.

The recording of the signal pulses may be carried out on an electric typewriter in the manner disclosed in our copending application Ser. No. 650,060, filed June 29, 1967 for "Method of and System for Recording Recurring Events."

By the use of two essentially identical systems according to our present invention, the activities of a test animal and an untreated control animal of the same species may be instantly compared advantageously with the aid of automatic equipment responsive to the output of both systems.

The invention will be described in greater detail with reference to the accompanying drawing, in which:

FIG. 2 is a circuit diagram, partly in block form, showing the overall system;

FIG. 3 is a graph showing the output voltage of an intermediate stage in the system of FIG. 2;

FIG. 4 shows part of a sheet of typewriter paper bearing markings produced by the system of FIG. 2 in accordance with the technique disclosed in our copending application;

FIG. 5 is a graph of the activity of a test animal plotted on the basis of the data obtained from the system of FIG. 2; and FIG. 6 is a block diagram of a slightly modified system according to our invention.

Figure 1:
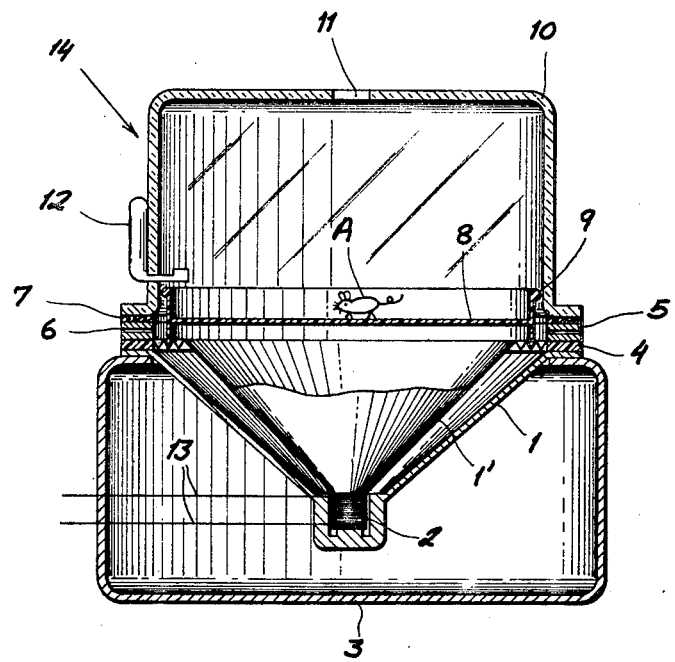
FIG. 1 is a view in sectional elevation of a signal generator, including an animal cage and a loudspeaker, forming part of a system according to our invention.

In FIG. 1 we have shown a signal generator, generally designated 14, comprising a loudspeaker 1 of conventional construction, having the usual voice coil 2 and a diaphragm 1' extending horizontally thereabove. Loudspeaker 1 is mounted in a housing 3 with the aid of a clamping ring 5 overlying an annular gasket 4. Ring 5 is traversed by several radial ventilating channels 6 communicating with the interior of a cylindrical cage 10 which is seated on the clamping ring 5 with interposition of a cushioning ring 7. A rigid platform 8, preferably of plastic material such as polystyrene, is carried on the diaphragm 1' and centered with reference to cage 10 so that an upstanding peripheral rim 9 of this platform is separated by a small all-around clearance from the inner wall of the cage. This peripheral clearance should be sufficient to prevent any contact between the cage and the platform, which would damp the vibrations of the latter, but small enough to prevent a test animal A, such as a white mouse, from introducing its snout between the cage and the rim, thereby discouraging it from gnawing at the platform. An opening 11 at the top of the cage allows for the admission of air or, if desired, of gases whose effect upon the animal is to be tested. A feeding trough 12 serves for the supply of water and food which may contain a medication to be administered for purposes of the test. The output leads of the voice coil 2 are indicated at 13.

In FIG. 2, the output circuit 13 of signal generator 14 leads to an amplifier 15 which may be of the A-C/D-C type and should be capable of amplifying the entire range of audio frequencies to which the loudspeaker 1 (FIG. 1) is susceptible. Since the vibrations to be measured may be quite low in frequency, e.g. down to about 3 cycles per second, the characteristic of the amplifier should be linear for frequencies upward of this lower limit.

Amplifier 15 works into a rectifier 16 which may also act as a further amplification stage and which energizes an integrating network 17 shown to comprise a capacitor 19 shunted by a resistor 29; the time constant of this network should be large compared with the period of the lowest frequency of interest.

Connected across network 17 is a relay 20 having two armatures 21, 22. Relay 20, indicated diagrammatically, is biased to respond only upon the voltage across condenser 19 reaching a predetermined threshold. When this occurs, relay 20 operates briefly and, via its armature 21, discharges the condenser; at its other armature 22, the relay generates a pulse transmitted to a load 18 here represented by an electric typewriter having a character key 31 whose actuating solenoid (not shown) is energized by that pulse. The line-feed and carriage-return mechanism 32 of the typewriter is periodically operated, under the control of a timer 33, so that a sheet 34 in the typewriter receives a set of markings 35 (FIG. 4), such as dots, varying in number along successive lines in accordance with the cadence of the signals from relay 20 within each operating cycle of the timer.

The outline O of the set of markings 35 on sheet 34 thus represents the activity of the animal A (FIG. 1) during consecutive timing cycles.

A voltmeter 36, connected across network 17, has an output as shown at 23 in FIG. 3, its voltage V rising progressively toward a limit 224 constituting the operating threshold for the relay 20. The successive timer cycles have been shown at $t_1$, $t_2$ etc. in FIG. 3. It will be seen that the number of dots 35 per line in FIG. 4 corresponds to the number of voltage reversals in FIG. 3 within each timer cycle.

In FIG. 6 we have diagrammatically illustrated two vibration sensors 14a, 14b, each similar to the assembly 14 of FIGS. 1 and 2, working into respective circuits 15a, 16a, 17a, 18a and 15b, 16b, 17b, 18b. Elements 15a, 16a, 17a and 15b, 16b, 17b correspond to elements 15, 16, 17 in FIG. 2. Elements 18a and 18b are identified as a pair of pulse counters working into a common comparison circuit 37 which detects any existing discrepancy between the two counts. Upon such discrepancy exceeding a predetermined magnitude, comparator 37 triggers an alarm device 38. Thus, with a test animal in apparatus 14a and a control animal in apparatus 14b, line 27 in FIG. 5 may represent the average number of signals counted by the circuit 18b during successive timing intervals, curve 28 having the same significance in regard to the count of circuit 18a. At an instant T, when the curve 28 begins to deviate appreciably from line 27, the alarm device 38 may be actuated. Thereafter, the experiment may be repeated with the same or a different test animal, using for example a different concentration of the substance administered to the mouse in apparatus 14a.

The use of a loudspeaker diaphragm as a vibration detector is particularly advantageous because of its great sensitivity in the range of frequencies induced by the activity of a test animal in the cage, or of a group of animals so confined for purposes of averaging the measure of their behavior. It is, however, also possible to utilize the principles herein disclosed in combination with other types of transducers, such as strain gauges, variable capacitors or piezoelectric crystals, attached to or in contact with the platform 8. Naturally, sturdier systems would be required in the case of larger test animals. Furthermore, as suggested in our copending application, the output of the system (e.g. as delivered by the alarm device 38 of FIG. 6) may be used to trigger a camera for the purpose of visually recording the behavior of a test animal under conditions of abnormal activity. Finally, the load circuit of the signal-pulse generator 20 may include a tape recorder, perforator or similar means for temporarily storing the pulses before feeding them to a utilization device, such as the typewriter 18 or the comparator 37, as likewise described in our copending application.

We claim:

1. An apparatus for testing the activity of a test animal, comprising a cage for confining an animal to be tested, said cage having a bottom in the form of a vibratile platform; electromechanical transducer means coupled with said platform for sensing the vibrations thereof and converting same into an electrical output; and indicator means responsive to said output connected to said transducer means; said transducer means comprising a generally horizontal diaphragm and an electro-acoustic voltage generator mechanically linked with said diaphragm, said platform being carried on said diaphragm.

2. An apparatus as defined in claim 1 wherein said indicator means includes circuit means for amplifying, rectifying and integrating the output of said generator, thereby producing a progressively varying unipolar voltage, and signaling means triggerable by said voltage upon attainment of a predetermined limit thereby.

3. An apparatus as defined in claim 2 wherein said circuit means includes an integrating network with a condenser chargeable to said predetermined limit, said signaling means including a relay connected across said condenser and provided with contacts for discharging said condenser concurrently with the generation of an output signal.

4. An apparatus as defined in claim 1, further comprising a second cage for confining a control animal, a second vibratile platform constituting the bottom of said second cage, and second electromechanical transducer means substantially identical with the first-mentioned transducer means coupled with said second platform, said indicator means including circuit means for comparing the outputs of both said transducer means.

5. An apparatus as defined in claim 1 wherein said cage comprises a cylindrical wall surrounding said platform with small peripheral clearance.

6. An apparatus as defined in claim 5 wherein said platform is provided with a peripheral ridge separated from said cylindrical wall by a gap small enough to prevent intrusion of the snout of a rodent serving as the test animal.

References Cited

UNITED STATES PATENTS

| | | | |
|---|---|---|---|
| 2,174,176 | 9/1939 | Journeaux et al. | 73—67 |
| 2,596,531 | 5/1952 | Clarke | 73—71.4 X |
| 2,636,964 | 4/1953 | Lancor et al. | 73—71.4 X |
| 2,686,705 | 8/1954 | Devignat | 119—1 X |
| 3,100,473 | 8/1963 | Kissel | 119—1 |
| 3,304,911 | 2/1967 | Hakata et al. | 119—29 X |
| 3,385,289 | 5/1968 | Lawson et al. | 128—2.06 |

ALDRICH F. MEDBERRY, Primary Examiner

U.S. Cl. X.R.

73—67